United States Patent
Barzen

(10) Patent No.: US 12,522,113 B2
(45) Date of Patent: Jan. 13, 2026

(54) VEHICLE SWIVELING SEATS

(71) Applicant: AGCO International GmbH, Neuhausen (CH)

(72) Inventor: Alexander Barzen, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 169 days.

(21) Appl. No.: 18/497,133

(22) Filed: Oct. 30, 2023

(65) Prior Publication Data
US 2024/0198866 A1    Jun. 20, 2024

(30) Foreign Application Priority Data
Dec. 14, 2022 (GB) .................................. 2218834

(51) Int. Cl.
*B60N 2/14* (2006.01)
*B60N 2/02* (2006.01)

(52) U.S. Cl.
CPC ........... *B60N 2/14* (2013.01); *B60N 2/02253* (2023.08); *B60N 2/0248* (2013.01)

(58) Field of Classification Search
CPC .......... B60N 2/14; B60N 2/143; B60N 2/146; B60N 2/02253; B60N 2/0248; B60N 2/0272
See application file for complete search history.

(56) References Cited

U.S. PATENT DOCUMENTS

| | | | |
|---|---|---|---|
| 4,846,529 A | 7/1989 | Tulley | |
| 4,934,462 A | 6/1990 | Tatara | |
| 5,482,354 A | 1/1996 | Gryp | |
| 6,643,577 B1 | 11/2003 | Padgett et al. | |
| 7,243,756 B2 | 7/2007 | Muraro | |
| 10,730,409 B2 | 8/2020 | Linnberg | |
| 2005/0189464 A1 | 9/2005 | Link | |
| 2017/0001540 A1* | 1/2017 | Reif | B60N 2/0248 |
| 2017/0210251 A1 | 7/2017 | Murray | |
| 2020/0055426 A1* | 2/2020 | Linnberg | B60N 2/146 |
| 2021/0070198 A1 | 3/2021 | Haller | |

FOREIGN PATENT DOCUMENTS

| | | | |
|---|---|---|---|
| EP | 1264940 B1 | 6/2004 | |
| EP | 2344408 B1 * | 5/2014 | B60N 2/24 |
| EP | 3835119 A1 | 6/2021 | |
| JP | 2010274713 A | 12/2010 | |

OTHER PUBLICATIONS

European Patent Office, Search Report related to EP23203297.9, mail date Apr. 9, 2024, 8 pages.
UK Intellectual Property Office, Search report for related UK Application No. GB2218834.6, dated May 25, 2023, 4 pages.

* cited by examiner

*Primary Examiner* — Richard G Davis

(57) ABSTRACT

A system for controlling the permitted angular rotation of a vehicle operator's seat about a vertical axis relative to the vehicle. The system has first stop rotatable with the seat and second stop mechanism carried by the vehicle for engagement by the first stop to limit the angular rotation of the seat relative to the vehicle. Controls adjust the second stop assembly to allow variation in the permitted angle of rotation of the seat dependent on various factors including the direction of travel of the vehicle, the orientation of the seat, and/or the mode of operation the vehicle.

18 Claims, 3 Drawing Sheets

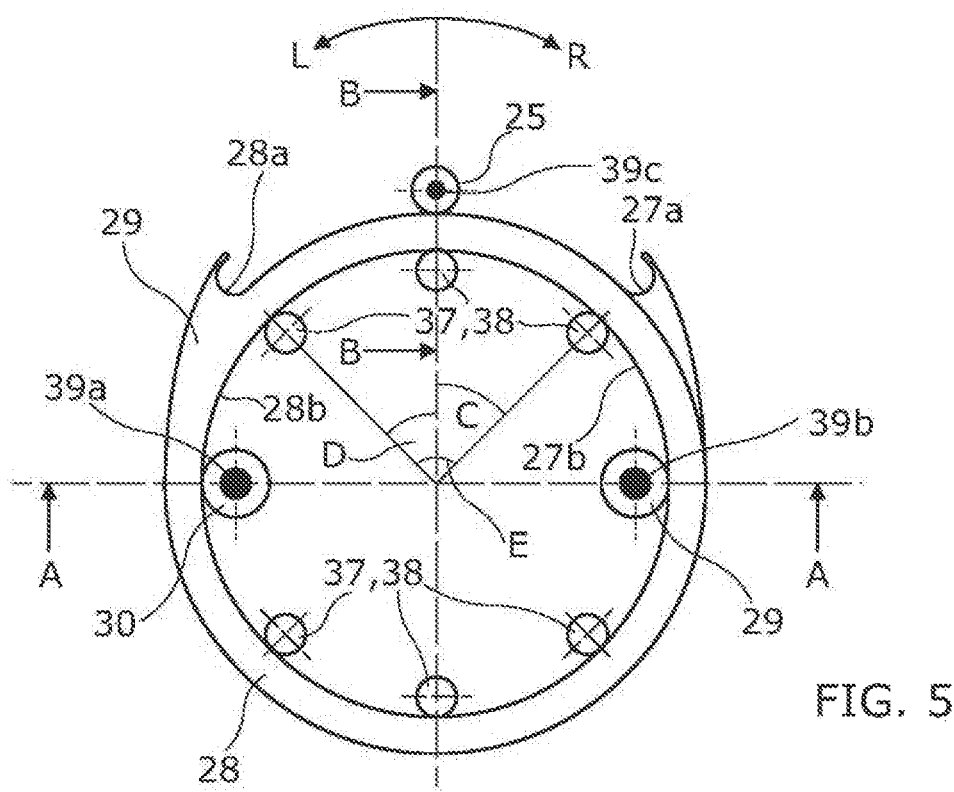
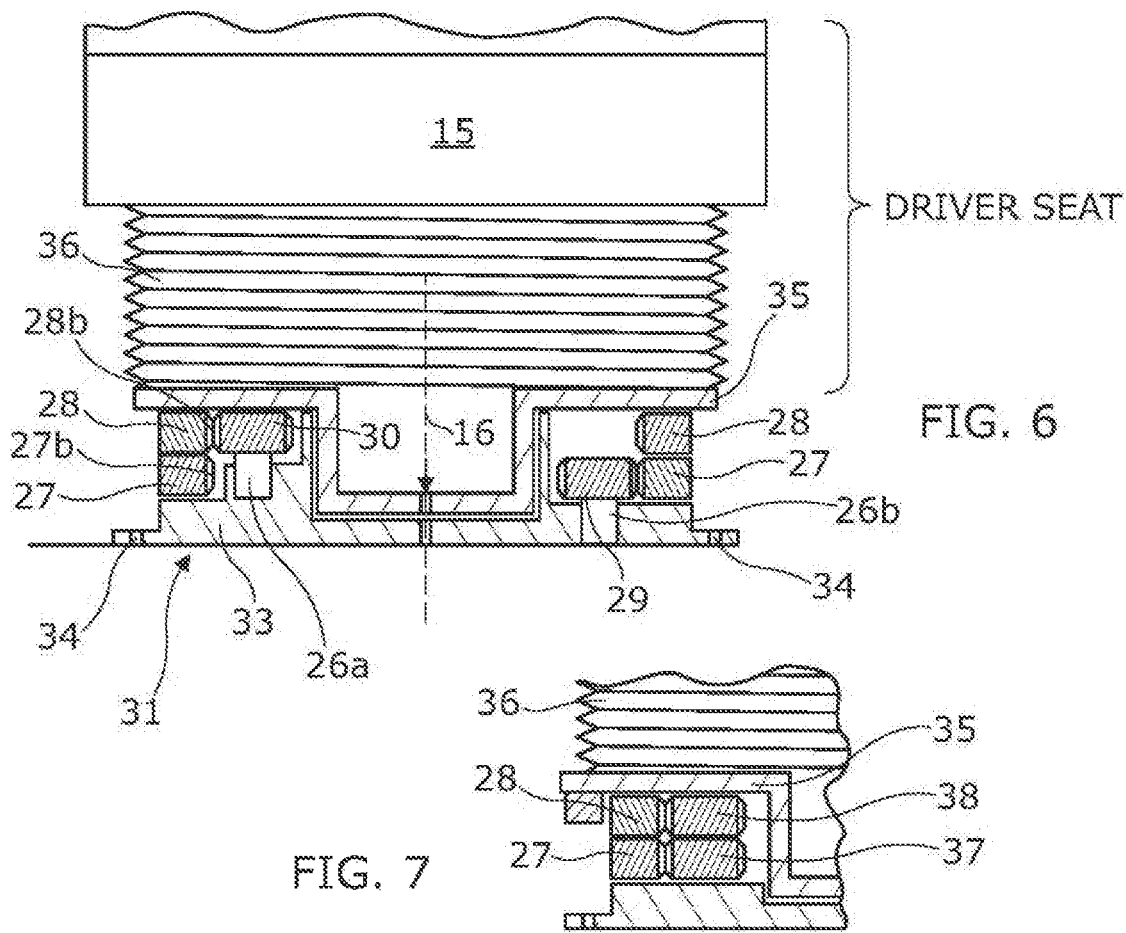
FIG. 5
FIG. 6
FIG. 7

VEHICLE SWIVELING SEATS

CROSS-REFERENCE TO RELATED APPLICATIONS

This application claims the benefit of the filing date of U.K. Patent Application 2218834.6, "Vehicle Swivelling Seats," filed Dec. 14, 2022, the entire disclosure of which is incorporated herein by reference.

FIELD

Embodiments of the present disclosure relate generally to swivel seats for vehicle operators and in particular to systems for controlling the permitted angular rotation of such seats about a vertical swivel axis.

BACKGROUND

It is well known to have such swiveling seats in vehicles such as agricultural or industrial tractors and other machines where such seats can, for example, swivel between a forward-facing direction and a rearward-facing direction depending on the mode of operation of the vehicle. It is also known in such seat control systems to provide stops to provide different amounts of angular rotation of the seat in the forward- and rearward-facing directions. Such known systems are relatively basic in their capabilities and cannot cater for the wide ranges of seat angular movement necessary in modern agricultural and industrial tractors and similar vehicles.

BRIEF SUMMARY

Some embodiments include a system for controlling a permitted angular rotation of a vehicle operator's seat about a vertical axis relative to a supporting structure of a vehicle to which the seat is mounted in use. The system has at least one first stop element rotatable with the seat, a second stop assembly for mounting to the supporting structure and having at least one abutment for engagement by the at least one first stop element to limit angular rotation of the seat relative to the supporting structure, and a control system operative to adjust the second stop assembly to limit rotation of the seat to a permitted angle of rotation.

Adjustment of the second stop assembly by the control system enables the permitted angle of rotation to be changed easily. Changing the permitted angle of rotation may include changing the magnitude of the permitted angle of rotation and/or changing to the position of the permitted angle of rotation position about the vertical axis. Thus, the permitted angle of rotation can be increased or decreased and/or moved so that the permitted range of angular rotation is displaced about the vertical axis. This would allow a permitted angle of rotation to be set when the seat is facing generally in a forward direction of the vehicle, an alternative permitted angle set when the seat is facing in a generally rearward direction, or anywhere in between.

The system can be automated so that appropriate permitted angles of rotation are set depending on various operating conditions or parameters without requiring input from an operator. This can improve vehicle safety. In some circumstances, the control system may enable an operator to selectively input a permitted angle of rotation. However, the system may then be configured so that the vehicle cannot be operated in a way which is determined to be unsafe, taking into account the permitted angle of rotation as set by the operator.

The control system may include an actuator arrangement for adjusting the second stop assembly, and a controller operative to control operation of the actuator arrangement. The controller may be an electronic controller and may be a programmable microprocessor-based controller. The controller may be, or be part of, an ECU. The controller may be configured to generate signals for controlling operation of the actuator arrangement using various techniques. The control system may comprise a sensor arrangement for providing at least one signal to the controller indicative of at least one of a rotary position of the seat and a configuration of the second stop assembly.

The at least one first stop element may comprise at least one first abutment fixed rotationally fast with the seat for movement about the vertical rotational axis of the seat as the seat rotates. The second stop assembly may comprise a pair of second abutments configured to be engaged by the at least one first abutment to control the angular rotation of the seat in opposite directions. The actuation arrangement may be configured for independently adjusting the positions of each of the second abutments to adjust the permitted angle of rotation of the seat. The at least one first abutment may be configured to rotate with the seat about the vertical axis in a circle at a first radius from the vertical axis and the second abutments may be adjustable to different positions on the circle. The second stop assembly may comprise two stop rings, each stop ring mounted for rotation about the vertical axis of rotation of the seat independently of the other, each stop ring carrying a respective one of the second abutments for engagement with the at least one first stop abutment carried by the seat to control the angular rotation of the seat in opposite directions, the position of each of the second abutments being varied by rotating the respective stop ring about the axis to determine the permitted angle of rotation of the seat. Where the control system has a sensor arrangement, the sensor arrangement may be configured for providing corresponding signals to the controller indicative of the rotary position of each stop ring. There may be only one first abutment and the second abutments may be configured to contact opposite side of the first abutment.

The second abutments on the two stop rings may be configured to engage the first stop arrangement on opposite sides to limit rotation of the seat about the vertical axis in either direction of rotation.

The actuator arrangement may comprise a respective stop ring actuator mechanism for rotating each stop ring about the vertical axis. Each stop ring actuator mechanism may comprise a motor drivingly engaging a periphery of the respective stop ring. The motor may drivingly engage an inner periphery surface of the stop ring. The motor may drivingly engage the periphery of the stop ring through a gear drive system. The motor may comprise a drive gear which engages corresponding gear teeth on the periphery of the stop ring. In one arrangement, the motors must be activated to hold the stop rings in position. Thus, when the motors are activated they prevent the stop rings being rotated about the vertical axis in the event a force is applied to rotate the seat beyond the permitted angle. In this arrangement, deactivating the motors enables the seat to be manually rotated beyond the last set permitted angle of rotation with at least one of the stop rings being moved as a result of the manual rotation force being applied to the stop ring through the first stop arrangement. Alternatively, the gear drive system may be self-locking (that is to say irreversible).

This prevents the stop rings being rotated away from their set positions in response to manual rotation of the seat even when the motors are not activated.

The stop rings may be supported one above the other from a base mountable in fixed relation to the supporting structure of the vehicle, the seat being mounted on a turntable located above the rings for rotation relative to the base about the seat's vertical axis of rotation. The stop rings may be located relative to the base by non-driven guide gears supported on the base and which engage gear formations on the peripheries of the rings.

The at least one first stop element may comprise a single stop abutment, which may be in the form of a pin projecting downward from the seat for engagement with the abutments on the stop rings.

The control system may be operative to adjust the second stop assembly to allow a predetermined angular rotation of the seat in at least one direction of rotation from a datum position. The control system may be operative to adjust the second stop assembly to allow a predetermined angular rotation of the seat in each of a first and a second direction of rotation from the datum and the amount of angular rotation permitted from the datum may be the same for each direction of rotation or may be different. For example, the datum position may correspond to a straight-ahead position of the operator's seat and the control system may operative to adjust the second stop mechanism to allow a predetermined angular rotation of the seat away from the straight-ahead position in one rotational direction only, such as a clockwise direction when viewed from above, or to allow a predetermined angular rotation of the seat away from the straight-ahead position in both rotary directions, i.e. to allow the seat to be rotated by a limited amount in both clockwise and counterclockwise directions from the datum. In this latter case, the control system may be operative to adjust the second stop assembly to allow a greater range of angular rotation away from the datum in a first rotary direction, say a clockwise direction, than in the opposite rotary direction.

The control system may be operative to vary the permitted angle of rotation of the seat in dependence on at least one operating condition of the vehicle. The control system may be operative to vary the permitted angle of rotation of the seat in dependence on at least one of a driving direction of the vehicle and/or a mode of operation the vehicle. For example, different permitted angles of rotation of the seat may be set when the vehicle is travelling in a forward direction and in a rearward direction.

The operator's seat may be rotatable between at least a generally forward-facing position and a generally rearward-facing position. Different permitted angles of rotation may be set in dependence in whether the seat is in the generally forward-facing position or the generally rearward-facing direction. The permitted angle of rotation may be determined in dependence on both the direction of travel of the vehicle and whether the seat is in the generally forward-facing position or generally rearward-facing position.

In some vehicles, a main steering wheel is provided to enable the vehicle to be steered when the operator's seat is in the generally forward-facing position. A secondary steering wheel may be provided to enable the vehicle to be steered when the operator's seat is in the generally rearward-facing position. In other alternative arrangements, the vehicle can steered through a joystick which is mounted for rotation with the operator's seat and which can be used to steer the vehicle whether the operator's seat is in the generally forward-facing position, the generally rearward-facing position, or is orientated somewhere between the generally forward-facing position and the generally rearward-facing position. Such a joystick steering control may be provided in addition to a main steering wheel. In this case, a secondary steering wheel is not required for steering the vehicle when the operator's seat is in the generally rearward-facing position. The joystick may be mounted in an armrest forming part of the operator's seat or attachable thereto.

The control system may be operative in at least one mode of operation in which it sets the permitted angle of rotation of the seat automatically in dependence on one or more inputs.

The control system may be operative in the at least one mode of operation to set the permitted angle rotation of the seat dependent on at least one of the following: whether the vehicle is operating on a road or in a field; whether the vehicle is being steered through a steering wheel or a joystick; whether the vehicle is controlling a second vehicle and the permitted angle of seat rotation needs to be varied dependent on the relative position of the two vehicles, which is optionally determined by GPS; whether the vehicle is determined to be in a safe condition for an operator to exit or enter the vehicle and the seat is to be allowed to pivot towards a door of the vehicle to enable the entry/exit of the operator; the vehicle being operated with a particular implement attached; the vehicle is exceeding a vehicle speed threshold; the driving direction of the vehicle and the current orientation of the seat; or the current rotational position of the seat and the configuration of at least one armrest attached to the seat.

In some embodiments, a vehicle comprises an operator's seat mounted to a supporting structure for rotation about a vertical axis relative to the supporting structure and a system for controlling a permitted angular rotation of the vehicle operator's seat according to any one of the preceding embodiments. The vehicle may be an agricultural vehicle such as a tractor. The vehicle may be an industrial or construction vehicle or a mobile machine.

Certain embodiments include a method of operating a system or a vehicle described out above, wherein the method comprises using the control system to automatically adjust a permitted angle of rotation of the seat.

The method may comprise using the control system to vary the permitted angle of rotation of the seat in dependence on at least one operating condition of the vehicle. The method may comprise using the control system to vary the permitted angle of rotation of the seat in dependence on at least one of a driving direction of the vehicle and a mode of operation the vehicle.

Adjusting the permitted angle of rotation of the seat may involve adjusting the magnitude of the permitted angle of rotation of the seat and/or the position of the permitted angle of rotation of the seat about the vertical axis of rotation of the seat.

The method may comprise using the control system to automatically set the permitted angle rotation of the seat dependent on at least one of the following: whether the vehicle is operating on a road or in a field; whether the vehicle is being steered through a steering wheel or joystick; whether the vehicle is controlling a second vehicle and the permitted angle of seat rotation needs to be varied dependent on the relative position of the two vehicles, which is optionally determined by GPS; whether the vehicle is determined to be in a safe condition for an operator to exit or enter the vehicle and the seat is to be allowed to pivot towards a door of the vehicle to enable the entry/exit of the operator; the vehicle being operated with a particular implement attached; the vehicle is exceeding a vehicle speed threshold; the driving direction of the vehicle and the current orientation of the seat; or the current rotational position of the seat and the configuration of at least one armrest attached to the seat.

Various aspects, embodiments, examples, and alternatives are set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which:

FIG. 5 shows a plan view of the stop arrangement of FIG. 4 set to give predetermined swivel angles to the left and right of a forward-facing datum;

FIG. 6 shows a sectional view through the stop arrangement of FIG. 4 taken on line A-A of FIG. 5 and additionally shows part of the operator's seat and a turntable on which the operator's seat is mounted for rotation;

FIG. 7 is a view similar to that of FIG. 6 but showing a sectional view through the stop arrangement taken on line B-B of FIG. 5;

DETAILED DESCRIPTION

All references cited herein are incorporated herein in their entireties. If there is a conflict between definitions herein and in an incorporated reference, the definition herein shall control.

Embodiments will now be described with reference to an agricultural tractor 10 such as that shown in FIG. 1. However, it should be appreciated that the principles described herein can be applied in a range of different vehicles, especially utility vehicles such as agricultural, industrial, and construction vehicles. Indeed, aspects can be adopted in any vehicle or mobile machine having an operator's seat configured to be able to rotate about a vertical axis so that an operator can control the vehicle with the seat rotated away from a straight-ahead position.

Figure 1:
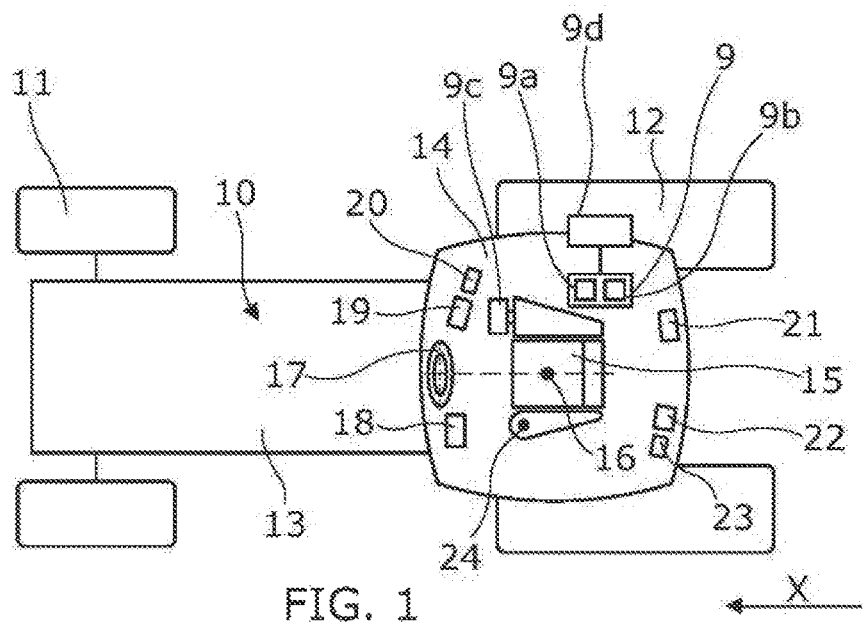
FIG. 1 shows a schematic plan view of an agricultural tractor with an operator cab, the roof of the cab roof removed to show internal details of the cab including a swiveling seat rotatable about a vertical axis and an embodiment of a control system, with the seat shown in a straight-ahead forward-facing position.
Figure 2:
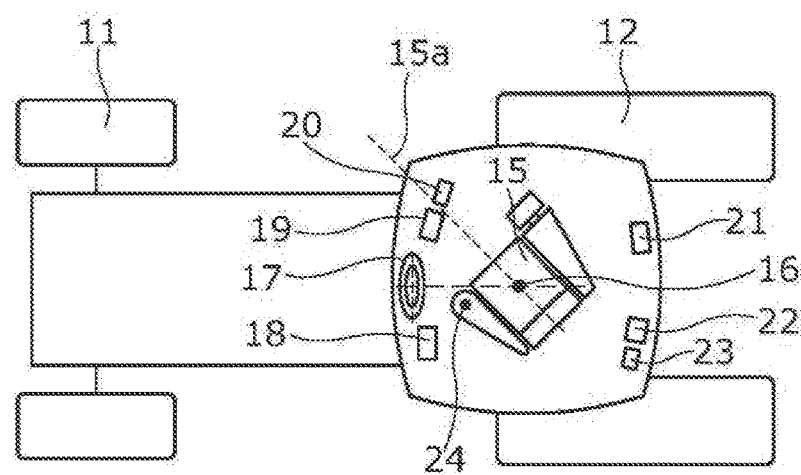
FIG. 2 shows the tractor of FIG. 1 with the seat swiveled through an angle of 45 degrees.
Figure 3:
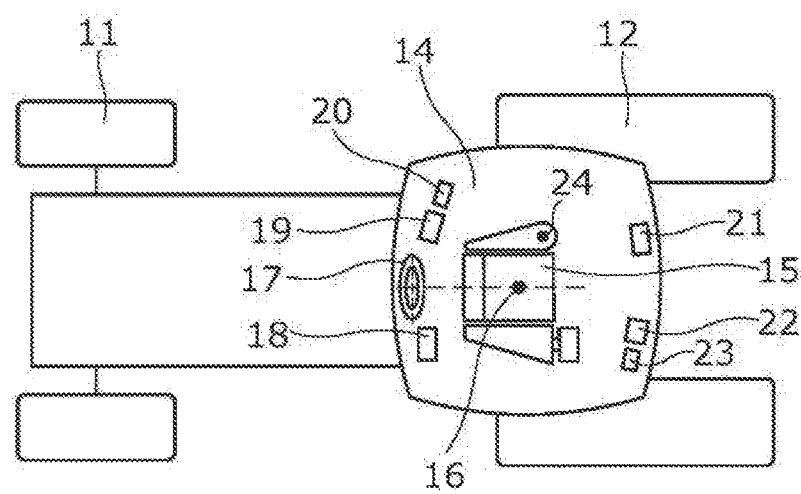
FIG. 3 shows the tractor of FIG. 1 with the seat facing rearwards.
Figure 4:
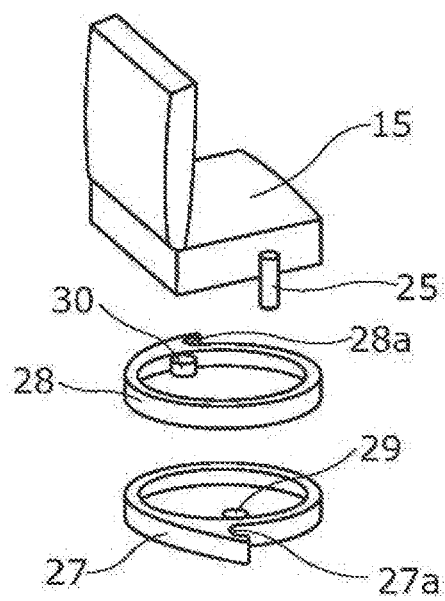
FIG. 4 shows a simplified exploded view of the seat and a stop arrangement forming part of the control system.

The agricultural tractor 10 of FIG. 1 has front and rear wheels 11 and 12, a chassis 13, and a cab 14, with its roof removed for clarity. Located within the cab 14 is an operator's seat 15 which can be swiveled about a vertical axis 16 at least between forward and rearward-facing positions as shown in FIGS. 1 and 3 respectively. The seat 15 can also be swivel to one or more intermediate positions between the forward and rearward-facing positions as illustrated in FIG. 2. In embodiments, the seat 15 can also be swiveled to the side opposite that shown in FIG. 2 to face a door of the tractor and enable an operator to enter and exit the tractor cab 14 more easily.

In this specification, the terms "forward" and "rearward", "front" and "rear" and the like should be understood from the perspective of an operator sitting on the seat 15 when facing in a forward moving direction of the vehicle as indicated by arrow X in FIG. 1. The terms "clockwise" and "counterclockwise" used in relation to rotational movement of the seat 15 refer to the rotational direction of movement of the seat when viewed from above in any of FIGS. 1 to 3.

A primary steering wheel 17 and front clutch, brake, and accelerator pedals 18, 19 and 20 are provided through which the vehicle can be controlled with the seat 15 in a generally forward-facing direction in a conventional manner. In addition to the primary steering wheel 17, the vehicle has a joystick 24 mounted, in this case, on the left armrest of the seat 15 through which the vehicle can be steered. In an embodiment, other functions of the vehicle such as acceleration and braking are also controllable through the joystick. An operator may optionally use the joystick 24 to steer the vehicle rather than using the primary steering wheel, for example when the seat 15 is pivoted away from the forward-facing position and especially when the seat is in the rearward-facing position. A further set of clutch, brake, and accelerator pedals 21, 22 and 23 are provided for use when the vehicle is being driven with the seat facing rearward. However, these could be omitted where these functions can be controlled through the joystick 24. In embodiments, a clutch peddle may not be required, especially in the rear facing position the tractor 10. This might be the case where the tractor 10 has an automated transmission or a continuously variable transmission, for example. In an alternative embodiment, the tractor is provided with a secondary rear steering wheel to steer the vehicle when the seat 15 is in a rearward-facing position. In this case, the joystick steering may be omitted.

FIGS. 4 to 7 illustrate an embodiment of an electronically actuatable control system for automatically regulating the permitted angular rotation of the seat 15 about its vertical axis 16. The seat carries a first stop 25 and a second stop assembly comprising stop rings 27 and 28 is mounted by a fixed base 33 bolted or otherwise secured to a structural component 31 of the tractor 10 at 34. In this case, the structural component 31 is a floor of the cab. The rings 27 and 28 are rotatable about axis 16 by driving gears 29 and 30 which engage teeth 27b and 28b on the inner peripheries of the rings (see FIG. 5). Each driving gear 29, 30 is driven by a respective motor 26a, 26b, and each ring has an abutment 27a and 28a respectively for engagement with the first stop 25 to limit the rotation of the seat 15. The first stop 25 may be in the form of a stop pin which projects downward from a part of the seat structure. The abutments 27a, 28a on the stop rings 27, 28 are configured to engage on opposite sides of the first stop 25 to limit rotational movement of the seat about the vertical axis 16 in either rotational direction. The motors 26a, 26b may drivingly engage the periphery of their receptive stop ring 27, 78 through any suitable arrangement.

As illustrated in FIGS. 6 and 7, the stop rings 27 and 28 may be supported one above the other from the base member 33. Seat 15 is mounted on a turntable 35 located above the rings via the customary bellows-type suspension unit 36. The turntable 35 pivots relative to the base 33 about the seat's vertical axis of rotation 16. The rings 27 and 28 are located relative to the base 33 by non-driven guide gears 37 and 38 (see FIG. 7) rotatably carried on the base member 33, which engage the gear teeth 27b and 28b on the peripheries of the rings.

The control system may comprise at least one controller or ECU (indicated schematically at 9) configured to generate output signals to control the electric motors 26a, 26b. The motors 26a, 26b may be electric stepper motors or any other suitable means to actuate the gears 29, 30, and so adjust the positions of the stop rings 27, 28 and set the permitted angle of rotation of the seat dependent on at least one operating parameter of the vehicle.

In one embodiment, the controller 9 comprises one or more processors, memory, and input/output (I/O) interface (s) (illustrated schematically at 9a, 9b, and 9c respectively in FIG. 1), all coupled to one or more data buses. The memory 9b may include any one or a combination of volatile memory elements (e.g., random-access memory RAM, such as DRAM, and SRAM, etc.) and non-volatile memory elements (e.g., ROM, hard drive, tape, CDROM, etc.). The memory 9b may store a native operating system, one or more native applications, emulation systems, or emulated applications for any of a variety of operating systems and/or emulated hardware platforms, emulated operating systems, etc. In one embodiment, the memory comprises an operating system and control software for regulating the permitted angle of seat rotation. It should be appreciated by one having ordinary skill in the art that in some embodiments, additional or fewer software modules (e.g., combined functionality) may be stored in the memory 9b or additional memory. In some embodiments, a separate storage device may be coupled to the data bus, such as a persistent memory (e.g., optical, magnetic, and/or semiconductor memory and associated drives).

Electronic communications among the various components of the control system may be achieved over a controller area network (CAN) bus or via a communications medium using other standard or proprietary communication protocols (e.g., RS 232, etc.). Communication may be achieved over a wired medium, wireless medium, or a combination of wired and wireless media.

The control system may include a sensor arrangement, indicated schematically at 9d, which provides input to the controller 9 as will be discussed later.

The input/output (I/O) interface(s) 9c may include a touch screen monitor and/or other interface arrangements such as push buttons, switches, dials and the like and may include a combination of different interface arrangements to enable an operator to input data and/or instructions and to receive information from the control system.

In one arrangement, the first stop 25 is located to be positioned forward of the axis of rotation 16 and aligned with a central longitudinal axis 15a of the seat 15 so that it is also aligned with a longitudinal axis of the vehicle when the seat is in a straight-ahead position as shown in FIG. 1. However, this need not be the case.

FIG. 5 shows the stop rings 27, 28 positioned to permit the seat 15 to be rotated from a central datum position corresponding with line B-B to the right (clockwise) through the angle C until the first stop abutment 25 on the seat contacts the abutment 27a. Similarly, the seat can be rotated to the left (counterclockwise) from the central datum the angle D until the first stop abutment 25 on the seat contacts the abutment 28a. This provides a combined maximum permitted angle of rotation E which is equal to the angle C plus the angle D. The angles C and D can be changed by rotating the rings 27 and 28 appropriately about axis 16 using gears 29 and 30 by actuating their associated motors 26a, 26b.

Figures 8, 9:
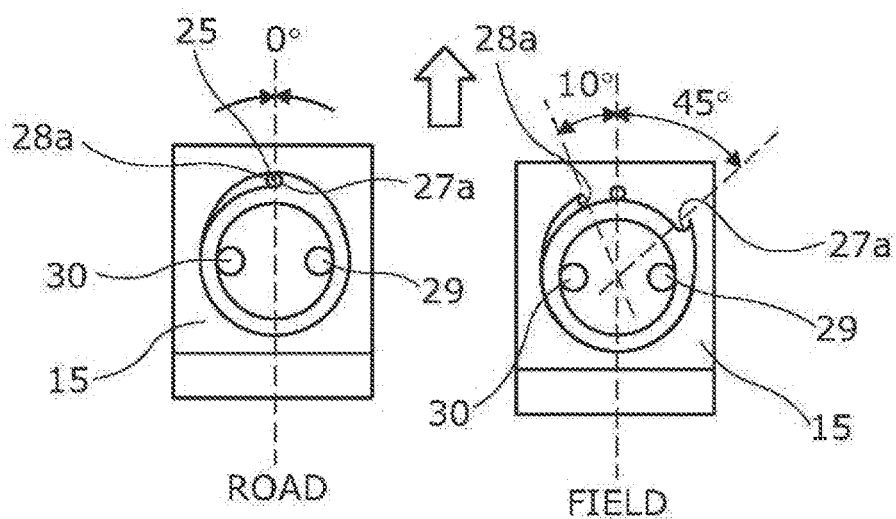
FIGS. 8 and 9 illustrate schematically how the stop arrangement can be set to allow different amounts of swivel angle with the seat in a generally forward-facing direction.

The stop rings 27, 78 are each rotatable about the axis 16 independently of one another, and the motors 26a, 26b are independently actuatable under the control of the controller 9. This enables the stop rings 27, 28 to be moved to adjust not only the magnitude of the permitted angle of rotation E but the location of the permitted angle of rotation about the axis rotation 16. For example, if the central datum position shown in FIG. 5 represents a straight-ahead position of the seat 15, the stop rings as positioned in FIG. 5 allow the seat to be rotated in either direction away from the straight-ahead position by a limited amount. This represents a generally forward-facing position of the seat 15 but where the seat is not fixed in a single straight-ahead position and may be suitable when the tractor 10 is being operated at relatively slow speeds, say in a field or a yard, and where the operator may wish to be able to swivel the seat 15 to increase their field of vision while still steering the tractor through the primary steering wheel 17. In this case, the permitted angle of rotation can be set at a value which enables safe operation of the vehicle using the primary steering wheel 17 and the forward pedals 18, 19, 20. However, when driving at faster speeds, say on a road, it may be desirable to limit the ability of the seat 15 to rotate away from the straight-ahead position more closely. FIG. 8 shows the rings 27 and 28 rotated so that their abutments 27a and 28a both simultaneously contact stop 25 to prevent swiveling of the seat 15 from the straight-ahead position. In an embodiment, the controller 9 is configured to apply such a limit to the permitted angle of rotation E, which is effectively set at 0 in the straight-ahead position of the seat, when the tractor 10 is exceeding a vehicle speed threshold or when it otherwise determines that the tractor is being operated in a road use mode of operation. It will be appreciated that the permitted angle of rotation E might not be set strictly to zero for road use but may generally be more significantly reduced than when the tractor is in a field or yard use mode of operation, for example.

FIG. 9 shows the rings 27 and 28 set to allow swiveling through 10 degrees to the left and 45 degrees to the right of the straight-ahead datum position. This is another example of a setting which might be used when the vehicle is operating off-road at relatively slow speeds and the operator needs to be able to see over an increased field of view to the right. In an example, this might be to enable the operator to monitor operations in relation to another vehicle which is following the tractor and which might, for example, be carrying a trailer into which an implement towed by the tractor is depositing material. In one arrangement, the control system may be arranged to adjust the second stop assembly to adjust the permitted angle of rotation dependent on the relative positions of the tractor 10 and a following vehicle, which could be determined by GPS using GPS sensors present on both the tractor 10 and the following vehicle or by other sensor arrangements. This type of arrangement might be particularly useful where the following vehicle is being controlled by the tractor, or the operator on the tractor, say as part of a leader-follower vehicle system. The controller 9 may be configured to permit a greater range of pivotal movement of the seat 15 away from the straight-ahead position when the vehicle is being steered via the joystick 15 rather than the primary steering wheel 17.

Figure 10:
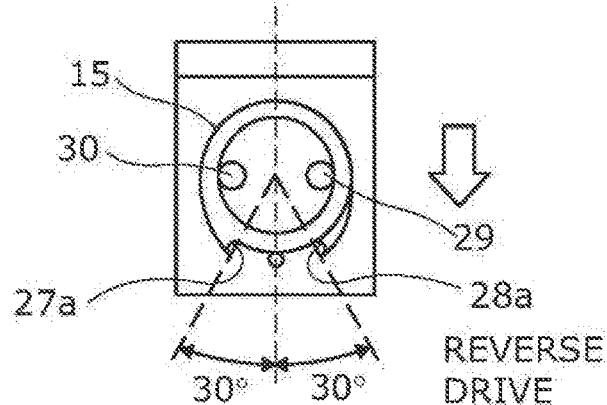
FIG. 10 illustrates schematically the stop arrangement set to provide equal amounts of swivel angle to the left and right from a datum with the seat in a generally rearward-facing direction.

FIG. 10 shows the stop rings set to allow 60 degrees of swiveling when the vehicle is operating with the seat in the rearward-facing position and under the control of the joystick. In this example, the stop rings 27, 28 are set to allow 30 degrees of swiveling either side of a central datum, which represents a central rearward-facing position 180 degrees offset from the straight-ahead position. In some circumstances, it can be desirable to only allow a more limited angle of rotation of the seat 15 when the seat is in a rearward-facing position than when it is in a forward-facing position for off-road use. Similar considerations may apply when the vehicle is fitted with a secondary steering wheel to steer the vehicle when the seat is facing in a rearward direction.

In an embodiment, the stop rings 27, 28 are held in their set positions by the motors 26a, 26b when the motors are activated. Thus the motors inhibit movement of the stop rings away from their set positions in the event a force is applied to the seat tending to move it beyond the permitted angle of rotation in one direction or another. However, the seat 15 can be rotated manually to cause one or other of the stop rings 27, 28 to be rotated due to engagement between the first stop 25 and the respective abutment 27a, 28a, when the motors are not activated. In this embodiment, the seat 15 can be manually rotated between forward and rearward-facing positions manually when the motors are not activated. The controller 9 may be configured to deactivate at least one of the motors 26a, 26b to enable the seat 15 to be manually rotated between a forward-facing position and a rearward-facing position only in response to a determination that the vehicle is in a safe operating condition for the maneuver. This might require a determination of at least some of the following conditions: the vehicle is stationary; the handbrake is applied; the engine is switched off; and/or the vehicle transmission is in neutral.

For example and referring to FIG. 5, if the seat is rotated manually from the forward-facing position in direction R to a rearward-facing with the motors not activated, the stop 25 on the seat will contact the abutment 27a and the stop ring 27 will be rotated around with the seat as it moves to the rearward-facing position. Once in the set is in a suitable rearward-facing position, the control system may be activated to rotate the stop rings 27 and 28 to set a suitable permitted angle of seat rotation E for use with the seat in the rearward-facing at position and perhaps also dependent on other operating conditions such as the type of implement connected to the tractor and/or an operational mode of the vehicle selected. This procedure is reversed to return the seat to the forward-facing position.

A maneuver to turn the seat 15 between forward- and rearward-facing positions may be initiated by the operator by selecting an option in a seat control menu of the seat control system. The operator may also designate a particular mode of operation to be adopted once the seat 15 has been turned, which determines the permitted angle of seat rotation E which is subsequently set. Alternatively, the control system may determine this automatically dependent on various inputs indicative of the mode of operation of the tractor 10 once the seat has been turned.

Alternatively, the seat 15 can be rotated between forward- and rearward-facing positions by the stop rings 27, 28 moved by the motors 26a, 26b operating under control of the controller 9.

In an embodiment, the gear drive between the motors and the stop rings 27, 28 may be self-locking or irreversible. This would prevent, or at least resist, movement of the stop rings 27, 28 in response to manual rotation of the seat 15 beyond a set permitted angle of rotation. Accordingly, if a force is applied to the seat 15 in an effort to rotate it beyond the permitted angle of rotation, the stop rings 27, 28 will not be moved even when the motors are not activated. This may be beneficial in enabling the motors 26a, 26b to be deactivated when not required to reposition the stop rings 27, 28 and so save on energy use. The driving gears 29, 30 may comprise a self-locking thread engaging a corresponding standard thread of the stop rings 27, 28 for fixating the positions of the stop rings once the motor is deactivated. In such an embodiment, the seat 15 can be rotated between forward and rearward-facing positions by the stop rings 27, 28 moved by the motors 26a, 26b operating under control of the controller 9. However, alternative arrangements that disconnect the gear drive to permit manual rotation of the seat 15 may be provided.

The sensor arrangement 9d may include sensors to determine the rotary position of the seat 15 and/or the rotary positions of the stop rings 27, 28. In an embodiment, the positions of the abutments 27a, 28a of the stop ring 27, 28 as well as the position of the first stop 25 can be monitored by sensors 39a, 39b, 39c. The sensors are in communication with the controller 9 and provide signals to the controller 9 indicative of the rotatory positions of the abutments 27a, 28a and/or the first stop 25, or of the stop rings 27, 28 and the seat 15 more generally. Alternatively, the controller may be configured to determine the rotary positions of the stop rings 27, 28 dependent on operation of the motors 26a, 26b. For example, where the motors are stepper motors, the controller 9 may be configured to determine the rotary positions of the stop rings based on the control signals sent to the motors, effectively counting the number of steps taken by each motor and the direction of the steps.

In some tractor installations, rotation of the seat 15 must be regulated to prevent the seat 15, or an armrest attached to the seat, from colliding with other components inside of the cab 14, e.g., the primary steering wheel 17 or the walls of the cab 14. In some tractors, the primary steering wheel 17 can be moved between an in-use position as illustrated in FIG. 1 to a storage position as illustrated in FIGS. 2 and 3 when the joystick steering is in use. Rotation of the seat 15 may then have to be more limited in certain positions when the primary steering wheel is in the in-use position. Furthermore, many tractor seats 15 have armrests that can be moved to different positions and/or adjusted, or which can be removed. In such installations, rotation of the seat 15 may have to be regulated in dependence on the position of the seat and/or the configuration of the armrest so to prevent the seat and/or the armrest colliding with other components inside of the cab. For these purposes, the sensor arrangement may include further sensors to monitor the actual position of the seat 15, the position or configuration of an armrest attached to the seat, and/or the position/configuration of the primary steering wheel. A sensor arrangement for determining whether the seat 15 is occupied may also be provided.

It will be appreciated that different factors need to be taken into consideration as regards regulation of seat rotation depending on the specific vehicle set up and the required sensor arrangement can be configured accordingly.

The control system can be configured to allow an operator to input or select a permitted angle of rotation of the seat 15 through the input/output (I/O) interface(s) 9c. In this case, the controller 9 may be configured to ensure that the vehicle is not operated in a manner that would be unsafe taking into account the permitted angle of rotation set by the operator. The control system may be arranged to inhibit unsafe operation of the vehicle, to automatically reconfigure the seat stop arrangement to ensure safe operation and/or issue a warning to the operator when the permitted angle of rotation set is not compatible with the current mode of operation.

In some tractors 10, the operator's seat is rotated to face a door of the cab to enable an operator to enter/exit the cab more easily. The controller 9 may be configured to adjust the stop rings 27, 28, or at least one stop ring, to permit the seat 15 to be rotated to an operator entry/exit position when it determines that the vehicle is in a safe operating condition for the maneuver. This might require a determination of at least one of the following conditions: the vehicle is stationary; the handbrake is applied; the engine is switched off; and/or the vehicle transmission is in neutral.

Generally it is expected that at least the vehicle must be stationary and the handbrake applied before the controller 9 will determine that it is safe to allow the seat 15 to be rotated to an operator entry/exit position. It should also be understood that an operator entry/exit position may not be a single fixed position of the seat 15 but may include a range of movement. Indeed, once the controller determines that the vehicle is in a safe operating condition for an operator to enter/exit the cab, the stop rings 27, 28 may be adjusted to allow a very wide range of rotational movement and that rotation of the seat may be largely unfettered. In an embodiment, an operator will enter a command to indicate that they wish to leave the cab and the stop rings adjusted accordingly once the controller 9 determines that the vehicle is in a safe operating condition for this. When the vehicle is shutdown, the stop rings 27, 28 may be automatically adjusted to allow the seat 15 to be rotated as required to allow an operator to enter or exit the cab 14.

In an alternative arrangement, the seat may be rotated to an operator entry/exit position by use of the second stop assembly pushing the first stop 25. In this case, at least one stop ring 27, 28 may be actuated to engage its abutment 27a, 28a with the first stop 25 and further rotated so that the abutment pushes the first stop 25 to rotate the seat 15 to an operator entry/exit position. Again, the control system may be configured to perform this maneuver only when it has determined the vehicle is in a safe condition to do so as set out above.

In the embodiments as shown, the first stop 25 has a single first abutment in the form of stop pin 25. However, the first stop could have at least two first abutments, each of which is engaged by a respective one of the abutments 27a, 28a of the second stop assembly. The first stop could, for example, included two stop pins spaced apart with the second stop assembly abutments 27a, 28a each contacting a respective one of the stop pins but on opposing sides to limit rotation of the seat in either direction. Furthermore, the second abutments 27a, 28a of the second stop assembly could be mounted using an arrangement other than rotating rings, provided that the position of each can be independently controlled to set a required permitted angle of rotation of the seat.

The control system may be arranged to determine an appropriate permitted angle of seat rotation E and to adjust the stop rings 27, 28 accordingly dependent on one or more operating condition/parameter of the vehicle. These might include any one for more of the following: the driving direction of the vehicle; the current orientation of the seat 15; the vehicle is determined to be in a safe operating condition for an operator to enter/exit the cab; the vehicle is determined to be in a safe operating condition for an operator to rotate the seat between forward-facing and rearward-facing positions; the type of implement attached to the tractor; an operating mode of the tractor, which may be selected by the operator; the vehicle is determined to be operating on a road; and/or the speed of the vehicle.

The control system may be configured to continuously determine an appropriate permitted angle of seat rotation E and to adjust the stop rings 27, 28 while the vehicle is in operation. Alternatively, or in addition, the control system may be configured to determine an appropriate permitted angle of seat rotation E and to adjust the stop rings 27, 28 in response to inputs from an operator and/or to changes in the operating mode of the tractor.

The control system allows for fully or partially automated control of the permitted angle of rotation of the seat 15. It will be appreciated that the control system can be arranged to vary the permitted angle rotation of the seat appropriately for operation of a wide range of attachment or implements or vehicle driving/operating conditions. This may be initiated automatically in response to connection of an implement or attachment or selection of an operating mode of the vehicle or may be initiated by manual selection by the operator from a list of saved parameters.

A predefined set of permitted angles of rotation E of the seat may be stored in the memory 9b, such as in a look-up table or the like. Alternatively, or in addition, the controller 9 may be configured to calculate suitable permitted angles of rotation based on the operating conditions or parameters of the vehicle.

The control system can be operated manually and can also be arranged to provide control of the possible angular rotation of the seat without any intervention of the vehicle operator thus ensuring that dangerous rotation of the seat is avoided.

What is claimed is:

1. A system for controlling a permitted angular rotation of a vehicle operator's seat about a vertical axis relative to a supporting structure of a vehicle to which the vehicle operator's seat is mounted, the system comprising:
    at least one first stop element rotatable with the seat, wherein the at least one first stop element comprises at least one first abutment fixed rotationally fast with the seat for movement about the vertical rotational axis of the seat as the seat rotates;
    a second stop assembly for mounting to the supporting structure and a pair of second abutments configured to be engaged by the at least one first stop element to control the angular rotation of the seat in opposite directions relative to the supporting structure; and
    a control system operative to adjust the second stop assembly to limit rotation of the seat to a permitted angle of rotation, wherein the control system comprises an actuator arrangement for adjusting the second stop assembly, and a controller operative to control operation of the actuator arrangement, the actuation arrangement configured for independently adjusting the positions of each of the second abutments so as to adjust the permitted angle of rotation of the seat.

2. The system of claim 1, wherein the control system is operative to vary the permitted angle of rotation of the seat in dependence on at least one operating condition of the vehicle.

3. The system of claim 1, wherein the control system is operative to vary at least one parameter selected from the group consisting of the magnitude of the permitted angle of rotation of the seat and the position of the permitted angle of rotation of the seat about the vertical axis of rotation of the seat.

4. The system of claim 1, wherein the second stop assembly comprises two stop rings, each stop ring mounted for rotation about the vertical axis of rotation of the seat independently from one another, each stop ring carrying a respective one of the second abutments for engagement with the at least one first stop abutment carried by the seat to control the angular rotation of the seat in opposite directions, the position of each of the second abutments being varied by rotating the respective stop ring about the axis to determine the permitted angle of rotation of the seat.

5. The system of claim 4, wherein the actuator arrangement comprises a respective stop ring actuator mechanism for rotating each stop ring about the vertical axis.

6. The system of claim 5, wherein each stop ring actuator mechanism comprises a motor drivingly engaging a periphery of the respective stop ring.

7. The system of claim 6, wherein the motor drivingly engages a periphery of the stop ring through a gear-drive system.

8. The system of claim 7, wherein the gear drive system is self-locking.

9. The system of claim 4, wherein the stop rings are supported one above the other from a base mountable in fixed relation to the supporting structure of the vehicle, the seat being mounted on a turntable located above the rings for rotation relative to the base about the seat's vertical axis of rotation.

10. The system of claim 9, wherein the stop rings are located relative to the base by non-driven guide gears supported on the base and which engage gear formations on the peripheries of the rings.

11. The system of claim 1, wherein the control system is configured to enable an operator to selectively input a permitted angle of rotation of the seat.

12. The system of claim 1, in which the control system is operative in at least one mode of operation in which the control system sets the permitted angle of rotation of the seat automatically in dependence on at least one input.

13. The system of claim 12, wherein the control system is operative in the at least one mode of operation to set the permitted angle rotation of the seat dependent on at least one parameter selected from the group consisting of:
   whether the vehicle is operating on a road;
   whether the vehicle is operating in a field;
   whether the vehicle is being steered via a steering wheel;
   whether the vehicle is being steered via a joystick;
   whether the vehicle is controlling a second vehicle;
   whether the vehicle is determined to be in a safe condition for an operator to exit or enter the vehicle;
   whether an implement is attached to the vehicle;
   whether the vehicle is exceeding a vehicle speed threshold;
   the driving direction of the vehicle and the current orientation of the seat; and
   the current rotational position of the seat and the configuration of at least one armrest attached to the seat.

14. A vehicle comprising an operator's seat mounted to a supporting structure for rotation about a vertical axis relative to the supporting structure and the system for controlling a permitted angular rotation of the vehicle operator's seat of claim 1.

15. A method of operating the system of claim 1, wherein the method comprises using the control system to automatically adjust a permitted angle of rotation of the seat.

16. The method of claim 15, further comprising using the control system to vary the permitted angle of rotation of the seat in dependence on at least one operating condition of the vehicle.

17. The method of claim 15, wherein using the control system to automatically adjust a permitted angle of rotation of the seat comprises adjusting at least one parameter selected from the group consisting of the magnitude of the permitted angle of rotation of the seat and the position of the permitted angle of rotation of the seat about the vertical axis of rotation of the seat.

18. The method of claim 15, further comprising using the control system to automatically set the permitted angle of rotation of the seat dependent on at least one parameter selected from the group consisting of:
   whether the vehicle is operating on a road;
   whether the vehicle is operating in a field;
   whether the vehicle is being steered via a steering wheel;
   whether the vehicle is being steered via a joystick;
   whether the vehicle is controlling a second vehicle;
   whether the vehicle is determined to be in a safe condition for an operator to exit or enter the vehicle;
   whether an implement is attached to the vehicle;
   whether the vehicle is exceeding a vehicle speed threshold;
   the driving direction of the vehicle and the current orientation of the seat; and
   the current rotational position of the seat and the configuration of at least one armrest attached to the seat.

* * * * *